(12) United States Patent
Wasemiller

(10) Patent No.: US 11,064,714 B2
(45) Date of Patent: Jul. 20, 2021

(54) HORIZONTAL MOLDING SYSTEM

(71) Applicant: Matthew M. Wasemiller, Temecula, CA (US)

(72) Inventor: Matthew M. Wasemiller, Temecula, CA (US)

(*) Notice: Subject to any disclaimer, the term of this patent is extended or adjusted under 35 U.S.C. 154(b) by 157 days.

(21) Appl. No.: 16/261,539

(22) Filed: Jan. 29, 2019

(65) Prior Publication Data

US 2020/0000119 A1 Jan. 2, 2020

Related U.S. Application Data

(60) Provisional application No. 62/763,665, filed on Jun. 27, 2018.

(51) Int. Cl.
*A23G 9/26* (2006.01)
*A23G 9/08* (2006.01)

(52) U.S. Cl.
CPC ............... *A23G 9/083* (2013.01); *A23G 9/26* (2013.01)

(58) Field of Classification Search
CPC .................................. A23G 9/221; A23G 9/26
See application file for complete search history.

(56) References Cited

U.S. PATENT DOCUMENTS

| 2,151,282 A * | 3/1939 | Stamp ..................... A23G 9/26 249/96 |
| 2,728,677 A | 8/1954 | Colman |
| 6,045,836 A | 4/2000 | Saunier et al. |
| 6,884,447 B2 | 4/2005 | Baker |
| 2018/0085972 A1* | 3/2018 | Kyttanen ................. A23G 9/26 |

* cited by examiner

*Primary Examiner* — James Sanders
(74) *Attorney, Agent, or Firm* — John D. Tran; Rhema Law Group, P.C.

(57) ABSTRACT

A horizontal molding system and method can include: an ice pop stick, the ice pop stick including: an ice pop stick key, the ice pop stick key including a key top side, a key bottom side and key edges, an inner portion having a top side, the inner portion vertically below the ice pop stick key, and an external portion coupled to the ice pop stick key, the external portion having a curve extended vertically down and horizontally away from the ice pop stick key and extended below a horizontal plane defined by the top side of the inner portion; and a mold including a notch and a mold upper lip, the notch configured to seal around the key edges and the key bottom side, and the key top side being co-planar with the mold upper lip.

20 Claims, 9 Drawing Sheets

HORIZONTAL MOLDING SYSTEM

CROSS-REFERENCE TO RELATED APPLICATIONS

This claims priority benefit to all common subject matter of U.S. Provisional Patent Application 62/763,665 filed Jun. 27, 2018. The content of these applications is incorporated herein by reference.

TECHNICAL FIELD

This disclosure relates generally to molded edible snacks, more particularly to horizontal molding systems for molding, storing, transporting, and displaying edible snacks.

BACKGROUND

Molding, storing, transporting, and displaying molded edible snacks presents many unique challenges in that the molding systems must generally be easy and intuitive to use, provide long term storage stability, while minimizing waste and mess. The majority of molded edible snacks, including ice pops and frozen novelties, are frozen in molds oriented vertically.

Vertically oriented molds can exhibit many shortcomings. For instance, without the use of stabilizers or food gums, sugar liquids will tend to separate vertically.

The vertical separation of sugary liquids can result in higher sugar content components sinking to the bottom and lower sugar content components rising to the top. Vertically oriented molds typically cause sugar level variances from bottom to top when food stabilizers are not used. Thus, vertically component separation still occurs, but stays consistent as you bite into and eat frozen ice pop from one end to the other end.

The use of food stabilizers and food gums can solve the problem of vertical separation of sugar content; however, the use of food stabilizers can negatively alter or even mask the flavors within the molded edible snack. Horizontally oriented molds can solve some problems of vertically oriented molds, especially in the area of vertical component separation.

While horizontally oriented molds can provide benefits over vertically oriented molds, horizontally oriented molds have their own special challenges. One such challenge arises from the design of many horizontally oriented molds, wherein the stick enters through a hole in the side of the mold at a level below the top fill of the liquid prior to freezing.

In other words, the stick enters through the mold in a location that would be centered in middle of the molded edible snack while on a horizontal plane. This design commonly suffers from leakage and mess as liquid can leak around the stick prior to freezing.

Yet another problem arising with molded edible snacks is that molded edible snacks with a higher sugar content and lack of gums and stabilizers tend to deform and separate over time when stored in a loose plastic wrapper. Shelf life suffers greatly as molded edible snacks can degrade in appearance when stored in a plastic wrapper rather than a mold.

Solutions have been long sought but prior developments have not taught or suggested any complete solutions, and solutions to these problems have long eluded those skilled in the art. Thus, there remains a considerable need for devices and methods that are easy and intuitive to use, provide long term storage stability, while minimizing waste and mess.

SUMMARY

A horizontal molding system and methods, providing easy and intuitive to use and long term storage stability, all while minimizing waste and mess, are disclosed. The molding system and methods can include: an ice pop stick, the ice pop stick including: an ice pop stick key, the ice pop stick key including a key top side, a key bottom side and key edges, an inner portion having a top side, the inner portion vertically below the ice pop stick key, and an external portion coupled to the ice pop stick key, the external portion having a curve extended vertically down and horizontally away from the ice pop stick key and extended below a horizontal plane defined by the top side of the inner portion; and a mold including a notch and a mold upper lip, the notch configured to seal around the key edges and the key bottom side, and the key top side being co-planar with the mold upper lip.

Other contemplated embodiments can include objects, features, aspects, and advantages in addition to or in place of those mentioned above. These objects, features, aspects, and advantages of the embodiments will become more apparent from the following detailed description, along with the accompanying drawings.

BRIEF DESCRIPTION OF THE DRAWINGS

The molding system is illustrated in the figures of the accompanying drawings which are meant to be exemplary and not limiting, in which like reference numerals are intended to refer to like components, and in which.

DETAILED DESCRIPTION

Figure 1:
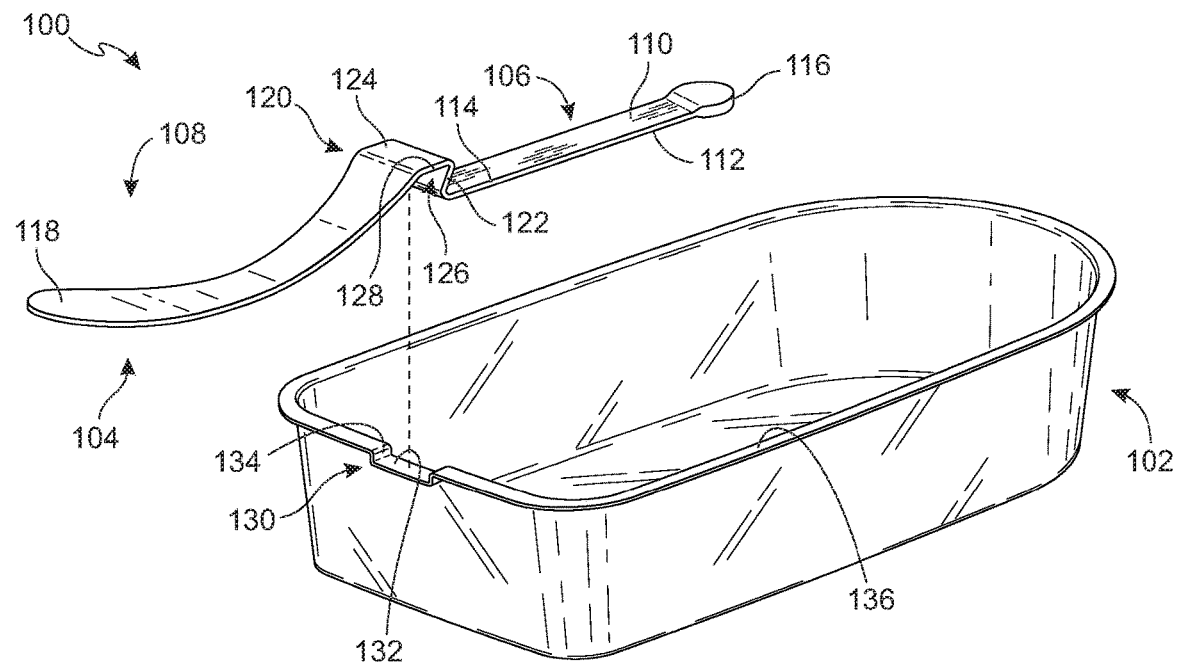
FIG. 1 is an isometric view of the molding system in a first embodiment and in an open configuration.

In the following description, reference is made to the accompanying drawings that form a part hereof, and in which are shown by way of illustration, embodiments in which the molding system may be practiced. It is to be understood that other embodiments may be utilized and structural changes may be made without departing from the scope of the molding system.

When features, aspects, or embodiments of the molding system are described in terms of steps of a process, an operation, a control flow, or a flow chart, it is to be understood that the steps can be combined, performed in a different order, deleted, or include additional steps without departing from the molding system as described herein.

The molding system is described in sufficient detail to enable those skilled in the art to make and use the molding system and provide numerous specific details to give a thorough understanding of the molding system; however, it will be apparent that the molding system may be practiced without these specific details.

In order to avoid obscuring the molding system, some well-known system configurations and descriptions are not disclosed in detail. Likewise, the drawings showing embodiments of the system are semi-diagrammatic and not to scale and, particularly, some of the dimensions are for the clarity of presentation and are shown greatly exaggerated in the drawing FIGs.

As used herein, the term system is defined as a device or method depending on the context in which it is used. For expository purposes, the term "horizontal" as used herein is defined as a plane parallel to the top plane or top side of an inner portion of the ice pop stick, regardless of its orientation. The term "vertical" refers to a direction perpendicular to the horizontal as just defined. Terms, such as "above", "below", "bottom", "top", "side", "higher", "lower", "upper", "over", and "under", are defined with respect to the horizontal plane.

Referring now to FIG. 1, therein is shown an isometric view of the molding system 100 in a first embodiment and in an open configuration. The molding system 100 is depicted including a mold 102 and an ice pop stick 104.

The ice pop stick 104 can have an inner portion 106 and an external portion 108. The external portion 108 is configured to extend out away from the mold 102 for providing a handle for a user to comfortably grab.

The inner portion 106 is configured to extend into the mold 102 and be in direct contact with a molded edible snack within the mold 102. The inner portion 106 can include a top side 110, a bottom side 112, and an edge 114.

The top side 110 and the bottom side 112 are depicted as substantially parallel with the edge 114 connecting vertically therebetween. Near one end of the inner portion 106 of the ice pop stick 104 furthest from the external portion 108, the ice pop stick 104 is depicted having an enlarged end 116.

The enlarged end 116 can be enlarged from the inner portion 106 of the ice pop stick 104 laterally, vertically, or a combination thereof. The enlarged end 116 can help to anchor the inner portion 106 of the ice pop stick 104 within the molded edible snack providing greater structural and mechanical adhesion therebetween.

The top side 110, the bottom side 112, and the edge 114 of the ice pop stick 104 can also be textured with a rougher surface texture for greater adhesion between the molded edible snack and the inner portion 106 of the ice pop stick 104. The greater adhesion between the molded edible snack and the inner portion 106 of the ice pop stick 104 can ensure the molded edible snack remains affixed to the ice pop stick 104 even under high load or large accelerations.

The external portion 108 of the ice pop stick 104 can be formed having a widened handle portion 118. The widened handle portion 118 can provide greater comfort and grip for a user. It is contemplated that the exact shape of the widened handle portion 118 should be understood as ornamental unless specifically claimed, as those having ordinary skill in the art would understand the subject matter of the claims as providing utility.

As will be appreciated, the ice pop stick 104 is depicted with the inner portion 106 extended horizontally along a horizontal plane defined by the top side 110 of the inner portion 106. The inner portion 106 and the external portion 108 can be coupled together by a ice pop stick key 120.

The ice pop stick key 120 can be elevated vertically above the inner portion 106 and the external portion 108. The external portion 108 can extend from the ice pop stick key 120 vertically down and away, in a shallow arc, to the horizontal plane defined by the top side 110 of the inner portion 106, and then gently extend back above the horizontal plane defined by the top side 110 of the inner portion 106 of the ice pop stick 104.

It has been discovered that the shallow arc of the external portion 108 from the ice pop stick key 120 to the horizontal plane defined by the top side 110 of the inner portion 106 provides a structurally balanced molded edible snack in the hand while simultaneously providing an enhanced grip for an end user.

The ice pop stick key 120 can be vertically above the inner portion 106 and can be coupled to the inner portion 106 with a vertical extension 122. While the vertical extension 122 vertically couples the ice pop stick key 120 to the inner portion 106, the vertical extension 122 is not to be understood as extending substantially vertically.

Instead, the vertical extension 122 is shown having a slant so that a portion of the ice pop stick key 120 overhangs part of the inner portion 106. Alternative configurations are also contemplated including substantially vertical extensions 122 as well as vertical extensions 122 that follow the interior surface of the mold 104.

The ice pop stick key 120 can include a key top side 124, a key bottom side 126, and key edges 128. The key top side 124 and the key bottom side 126 can be flat and parallel to one another. The ice pop stick key 120 can be designed to fit within a notch 130 formed within the mold 102.

The notch 130 within the mold 102 can include a notch bottom surface 132 coupled to notch side portions 134 extending up to contact a mold upper lip 136. In a closed configuration, such as the closed configuration of FIG. 2 for example, the ice pop stick key 120 can fit within and in direct contact with the notch 130 creating a seal therewith.

That is, the key bottom side 126 can sit flush against the notch bottom surface 132. The key edges 128 can sit flush against the notch side portions 134. Further, the key top side 124 can be positioned coplanar with the mold upper lip 136 so that a seal can be made with the molding system 100 in a closed configuration with the ice pop stick 104.

The mold 102 is shown having a rounded end with a standard ice pop shape. However, it should be understood that other mold shapes are contemplated, and molds of other shapes do not depart from the molding system 100 as disclosed herein.

The mold 102 is depicted as a single serve mold for molded edible snacks. It has been discovered that many unexpected benefits arise as a result of implementing the molding system 100 with molded edible snacks including a reduction in leakage and waste from the ice pop stick 104 exiting the mold 102 with the ice pop stick key 120 through the notch 130 above a fluid fill level.

It is contemplated that the mold 102 can be sealed by heat sealing or adhesively sealing a plastic film in direct contact with the mold upper lip 136 and the key top side 124. As will be appreciated, a precision fit will ensure that the ice pop stick key 120 will stay locked and sealed within the notch 130 until the molded edible snack is frozen.

Figure 2:
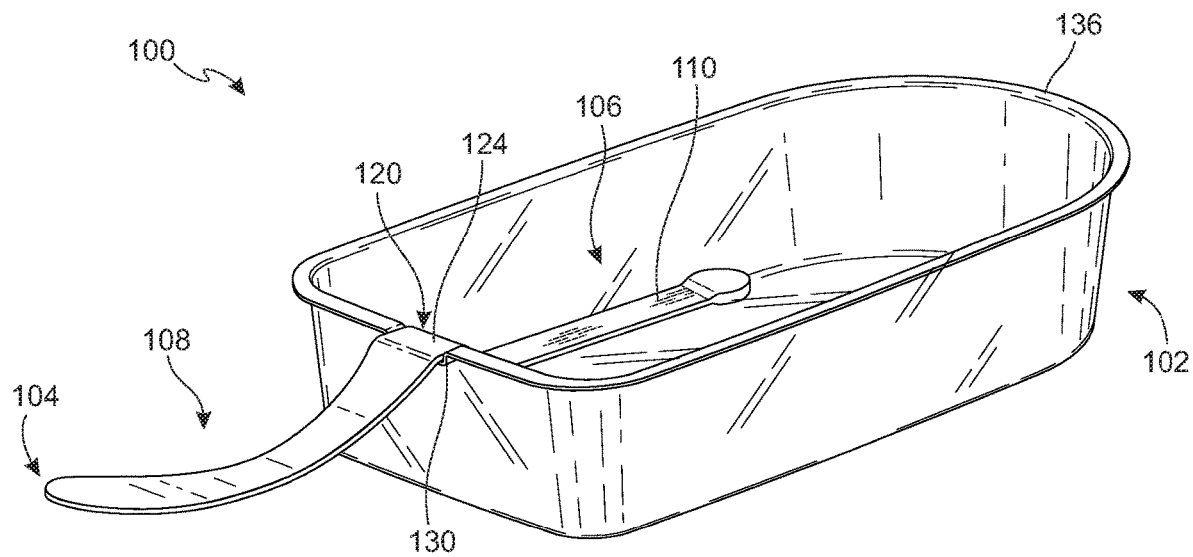
FIG. 2 is an isometric view of the molding system of FIG. 1 in a closed configuration.

Referring now to FIG. 2, therein is shown an isometric view of the molding system 100 of FIG. 1 in a closed configuration. The closed configuration of the molding system 100 can include the ice pop stick 104 in direct contact with the mold 102 having the ice pop stick key 120 fitting within the notch 130 of the mold 102.

The inner portion 106 of the ice pop stick 104 is depicted extending horizontally into the mold 102 from a back portion of the mold 102 near the notch 130. The external portion 108 of the ice pop stick 104 can be seen extended in a vertical curve down and away from the ice pop stick key 120 to pass through a horizontal plane defined by the top side 110 of the inner portion 106 of the ice pop stick 104.

The curve of the external portion 108 through a horizontal plane defined by the top side 110 of the inner portion 106 provides balance of the molding system 100 when the ice pop is held in the hand. However, the ornamental design of the curve of the external portion 108 should be understood as ornamental unless specifically claimed, as those having ordinary skill in the art would understand the subject matter of the claims as providing utility.

It is contemplated that the mold 102 can be sealed by heat sealing or adhesively sealing a plastic film in direct contact with the mold upper lip 136 and the key top side 124. As will be appreciated, a precision fit will ensure that the ice pop stick key 120 will stay locked and sealed within the notch 130 until the molded edible snack is frozen.

That is, the key top side 124 can be coplanar with the mold upper lip 136 to ensure the entire product can be sealed. Further, the ice pop stick key 120 can provide a precision interference fit with the notch 130 ensuring an air tight seal is maintained between the ice pop stick key 120 and the notch 130.

Figure 3:
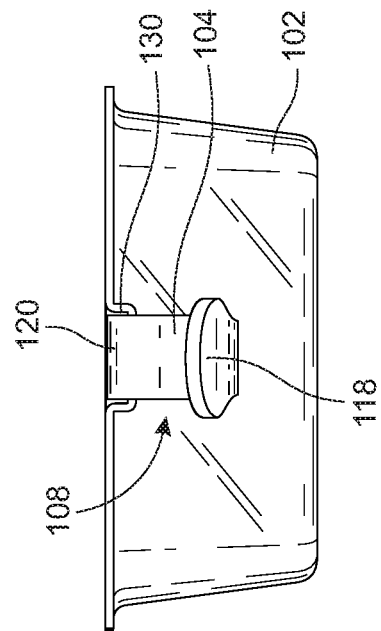
FIG. 3 is a front side view of the molding system of FIG. 2.

Referring now to FIG. 3, therein is shown a front side view of the molding system 100 of FIG. 2. The front side view of the molding system 100 can depict a front portion of the mold 102 terminating vertically with the mold upper lip 136. As will be appreciated, the key top side 124 of FIG. 1 of the ice pop stick 104 of FIG. 1 is not extended up above the mold upper lip 136.

Figure 4:
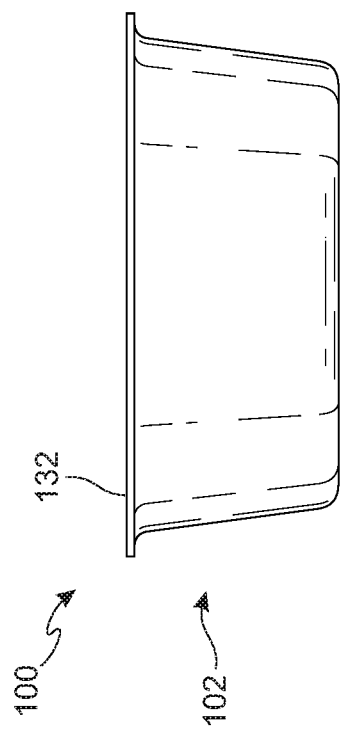
FIG. 4 is a back side view of the molding system of FIG. 2.

Referring now to FIG. 4, therein is shown a back side view of the molding system 100 of FIG. 2. The molding system 100 is shown depicting a back portion of the mold 102 including the notch 130, and the ice pop stick key 120 of the ice pop stick 104 within the notch 130.

The external portion 108 of the ice pop stick 104 can be seen extending down in a curve away from the ice pop stick key 120 and widening out again near the widened handle portion 118. As will be appreciated the external portion 108 of the ice pop stick 104 can curve down to a midline halfway between the bottom of the mold 102 and the fill line of the molded edible snack in order to maintain balance in the hand of a user.

Figure 5:
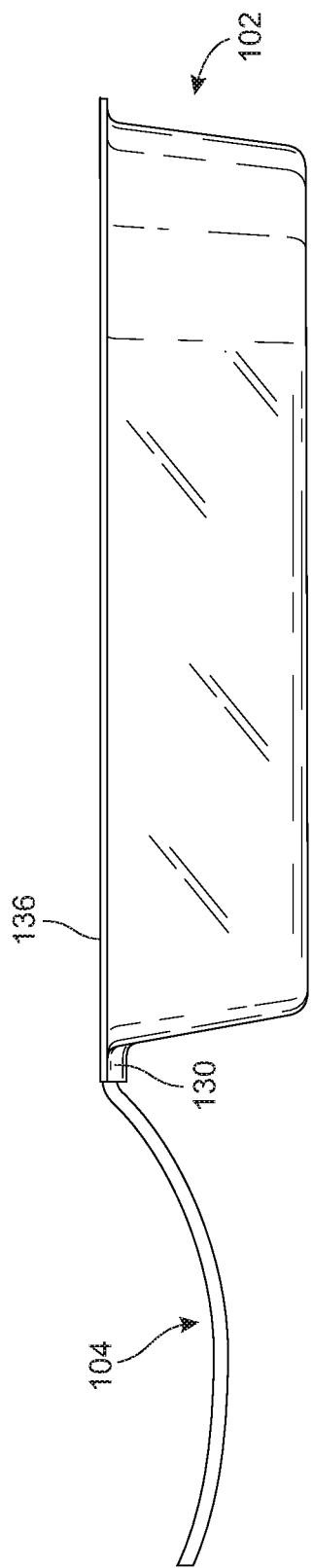
FIG. 5 is a side view of the molding system of FIG. 2.

Referring now to FIG. 5, therein is shown a side view of the molding system 100 of FIG. 2. The notch 130 of the mold 102 is shown extended out laterally from the mold 102 to be co-terminating with the mold upper lip 136. The ice pop stick 104 is shown exiting the mold 102 from the notch 130 providing a tight seal between the ice pop stick 104 and the mold 102.

Figure 6:
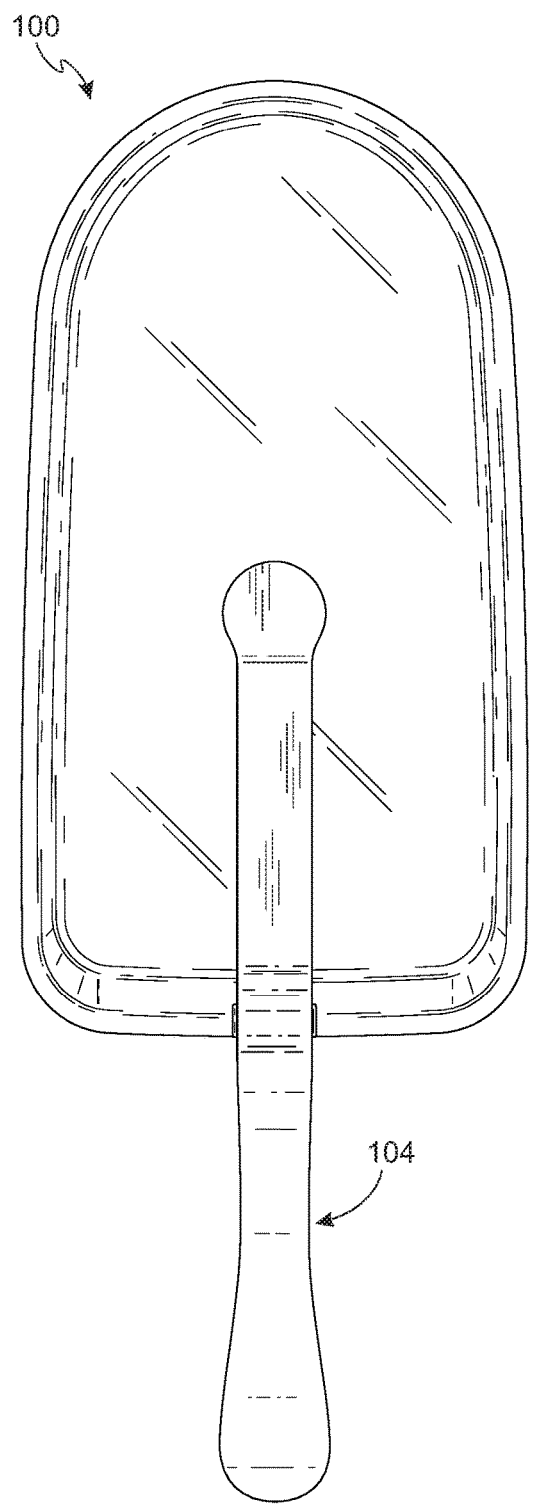
FIG. 6 is a top side view of the molding system of FIG. 2.

Referring now to FIG. 6, therein is shown a top side view of the molding system 100 of FIG. 2. The molding system 100 is shown having the ice pop stick 104 positioned and extending into the middle of the mold 102. The molding system 100 can be in the configuration for filling the mold 102 with the liquid for the molded edible snacks.

Figure 7:
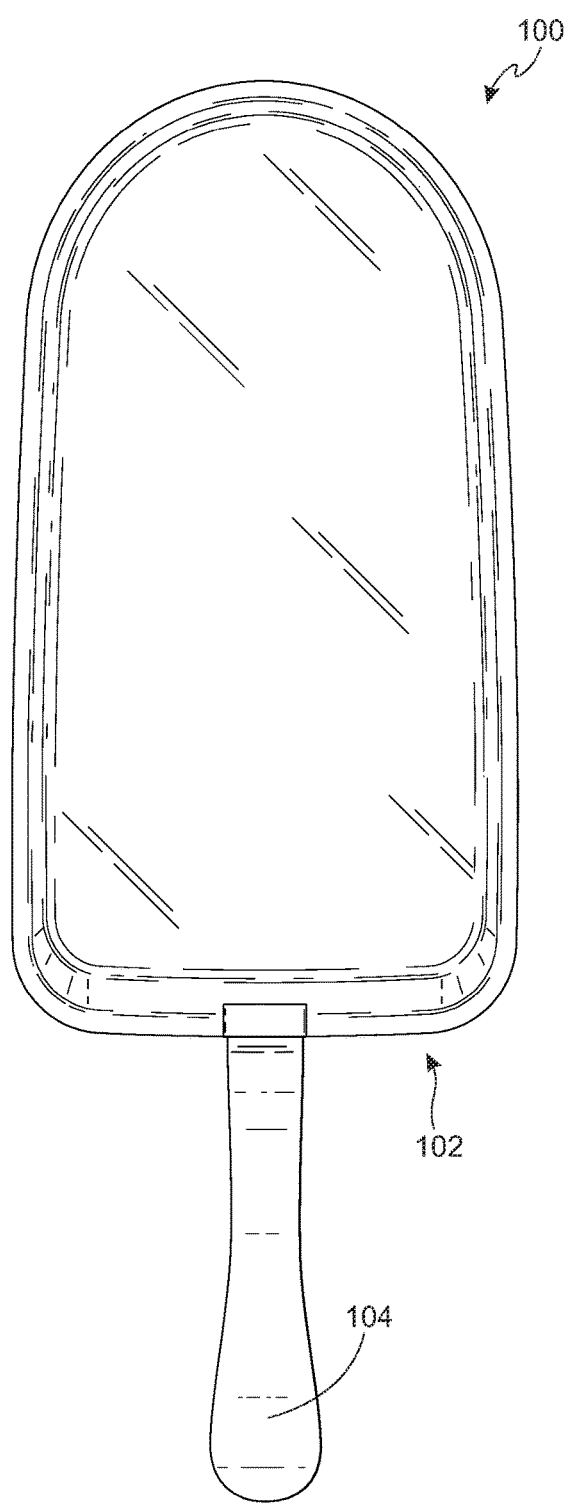
FIG. 7 is a bottom side view of the molding system of FIG. 2.

Referring now to FIG. 7, therein is shown a bottom side view of the molding system 100 of FIG. 2. The molding system 100 can depict the bottom portion of the mold 102 and the ice pop stick 104 extending therefrom.

Figure 8:
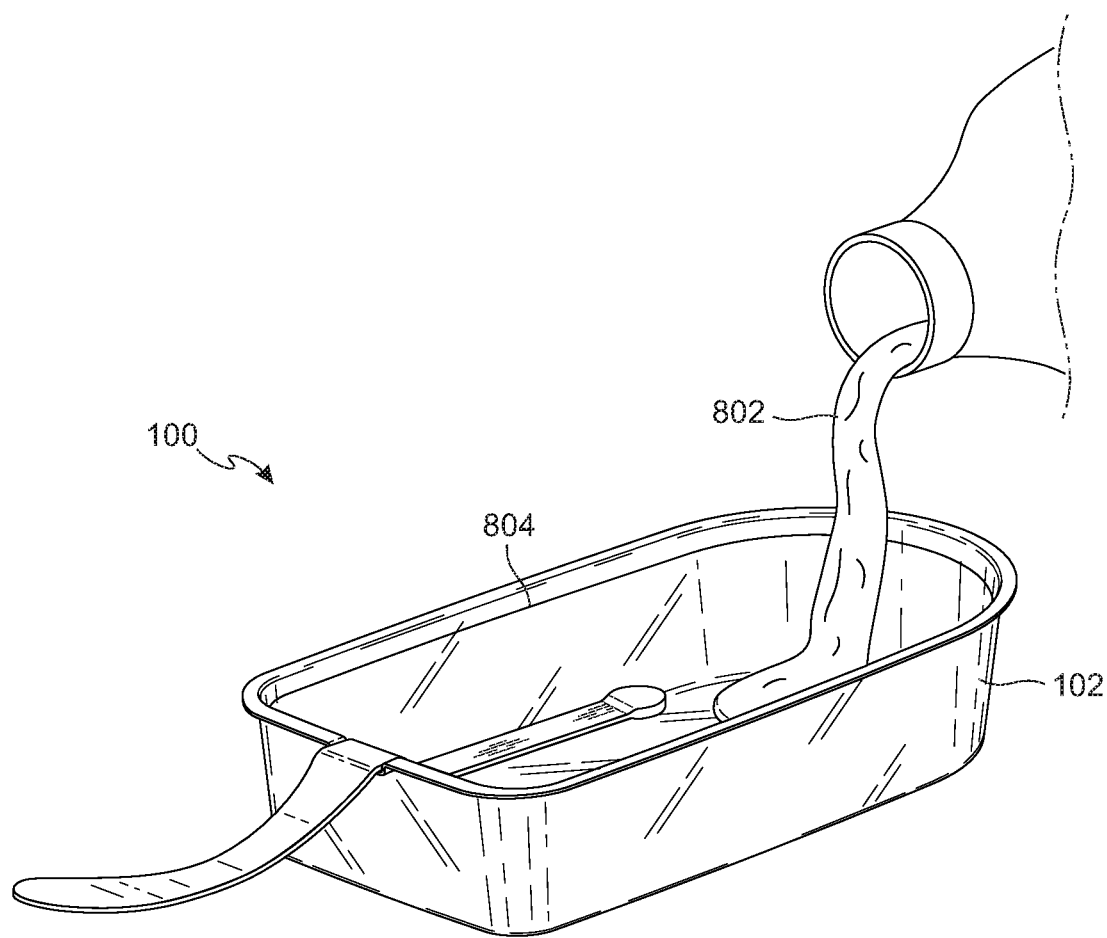
FIG. 8 is an isometric view of the molding system of FIG. 2 in an initial filling stage of operation.

Referring now to FIG. 8, therein is shown an isometric view of the molding system 100 of FIG. 2 in an initial filling stage of operation. The initial filling stage of operation is depicted with the molding system 100 in the closed configuration where the ice pop stick 104 is mated with and directly coupled to the notch 130 of the mold 102.

It is alternatively contemplated that the filling steps can be accomplished with the molding system 100 in an open configuration before the ice pop stick 104 is attached to the mold 102. The mold 102 is shown having a filling 802 being poured therein.

The filling 802 can be a liquid, paste, or gel intended to be frozen, and to remain frozen until consumption. The filling 802 can be poured into the mold 102 until the filling 802 reaches a fill line 804.

Figure 9:
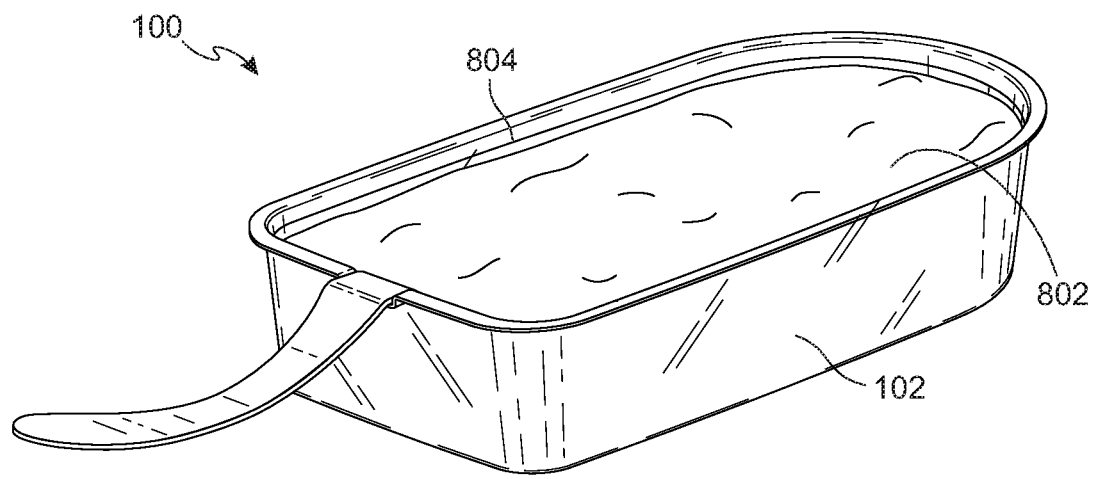
FIG. 9 is an isometric view of the molding system after the initial filling stage of FIG. 8.

Referring now to FIG. 9, therein is shown an isometric view of the molding system 100 after the initial filling stage of FIG. 8. The initial filling stage can be implemented to bring the filling 802 up below the fill line 804 of the mold 102. Filling the mold 102 below the fill line 804 ensures there is additional room for other ingredients.

Figure 10:
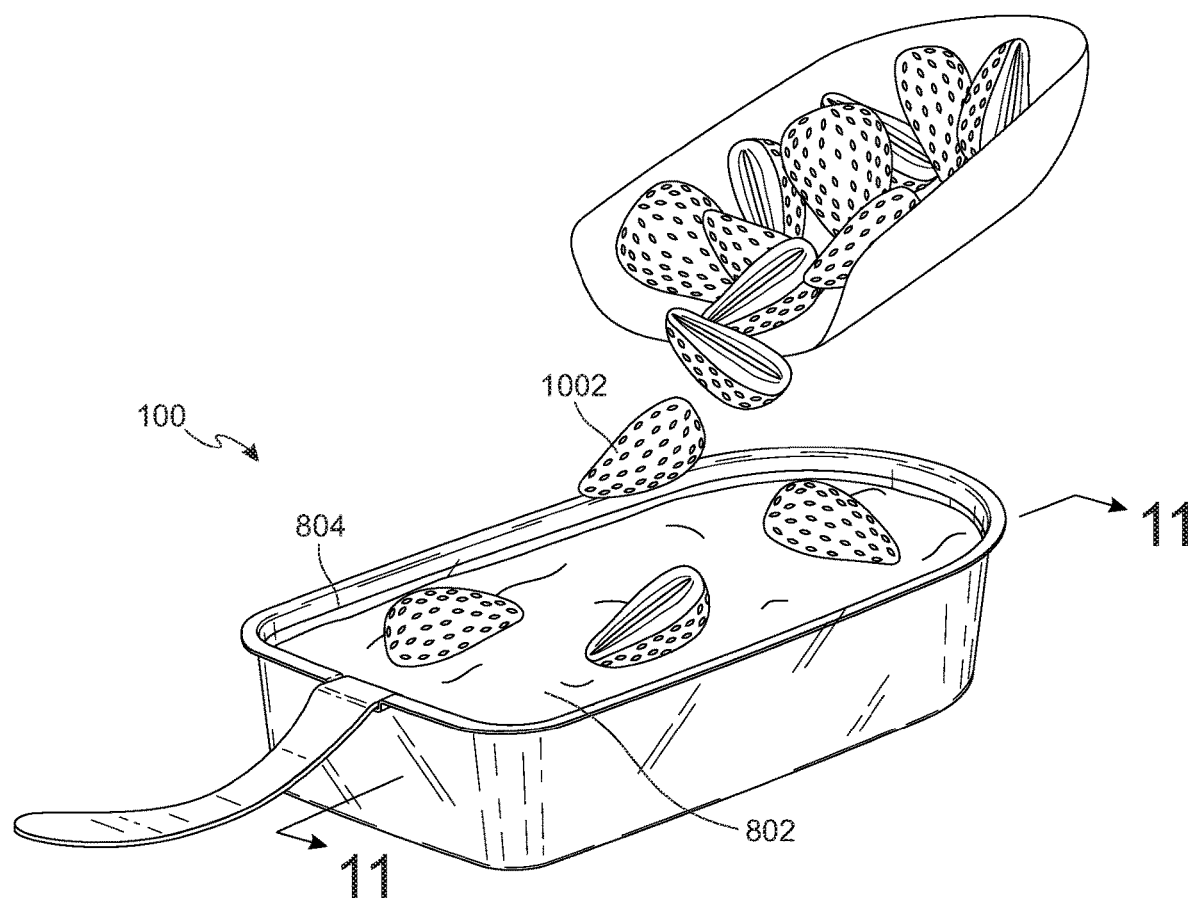
FIG. 10 is an isometric view of the molding system of FIG. 9 in a subsequent filling stage of operation.

Referring now to FIG. 10, therein is shown an isometric view of the molding system 100 of FIG. 9 in a subsequent filling stage of operation. During the subsequent filling stage of operation additional fills 1002 are added to the filling 802.

The additional fills 1002 can include fruit, candy, or other components with a flavor or texture complementary to the filling 802. The addition of the additional fills 1002 can bring the level of the filling 802 up to the fill line 804.

Figure 11:
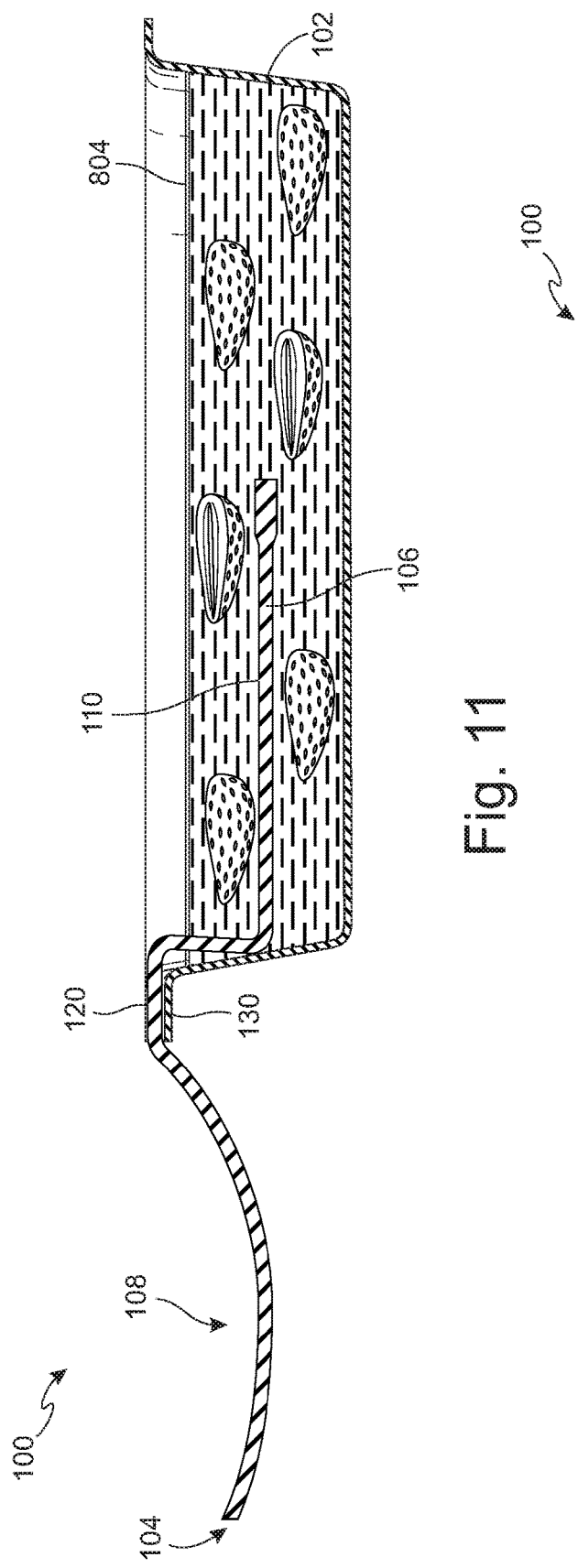
FIG. 11 is a cross-sectional view of the molding system of FIG. 10 along the line 11-11.

Referring now to FIG. 11, therein is shown a cross-sectional view of the molding system 100 of FIG. 10 along the line 11-11. The molding system 100 is depicted having the ice pop stick key 120 of the ice pop stick 104 mated with the notch 130 of the molded edible snack, with both the notch 130 and the ice pop stick key 120 above the fill line 804 of the mold 102.

Further, the external portion 108 of the ice pop stick 104 is shown extending down and horizontally away from the ice pop stick key 120, to a level below a horizontal plane defined by the top side 110 of the inner portion 106 of the ice pop stick 104. The vertical extension 122 of the ice pop stick 104 can be seen contacting the mold 102 at a single point near the inner portion 106.

The vertical extension 122 can further extend vertically up and away from the mold and the inner portion 106 until contacting the ice pop stick key 120 leaving a space between the mold 102 and the vertical extension 122.

As will be appreciated the additional fill 1002 can be evenly distributed within the molded edible snack due to the horizontal nature of the molding system 100. Further, since the ice pop stick 104 employs the ice pop stick key 120 and the notch 130 of the mold 102 above the fill line 804 mess and waste is avoided. Yet further, since the molded edible snack is contained within the molding system 100, the molded edible snack can have a greatly extended shelf life.

Figure 12:
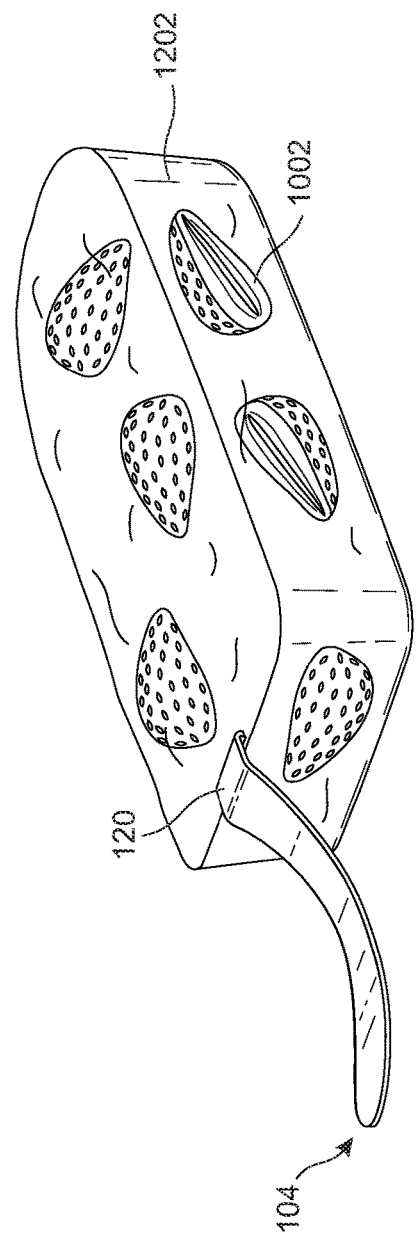
FIG. 12 is an isometric view of the molding system of FIG. 10 after a removal stage of operation.

Referring now to FIG. 12, therein is shown an isometric view of the molding system 100 of FIG. 10 after a removal stage of operation. The mold 102 of FIG. 1 has been removed from the molded edible snack 1202 leaving the ice pop stick 104 extending out of the molded edible snack 1202.

It has been discovered that the horizontal molding technique employed with the ice pop stick key 120 of FIG. 1 and the notch 130 of FIG. 1 can keep sugar content equal on a horizontal plane. Horizontal freezing leads to uniformity of molded edible snack 1202 without the use of stabilizers and gums. Horizontal freezing also allows edible decorations such as the additional fills 1002 to be placed on top surface prior to freezing leading to a very attractive and eye catching product which can also accentuate flavor in that particular portion of product.

Leaks are eliminated because insertion point of ice pop stick key 120 is above the top level of liquid or suitable ingredients to create the molded edible snack 1202. This unique design resists leakage prior to freezing, allows beautiful display of product, and keeps product fresher longer.

Figure 13:
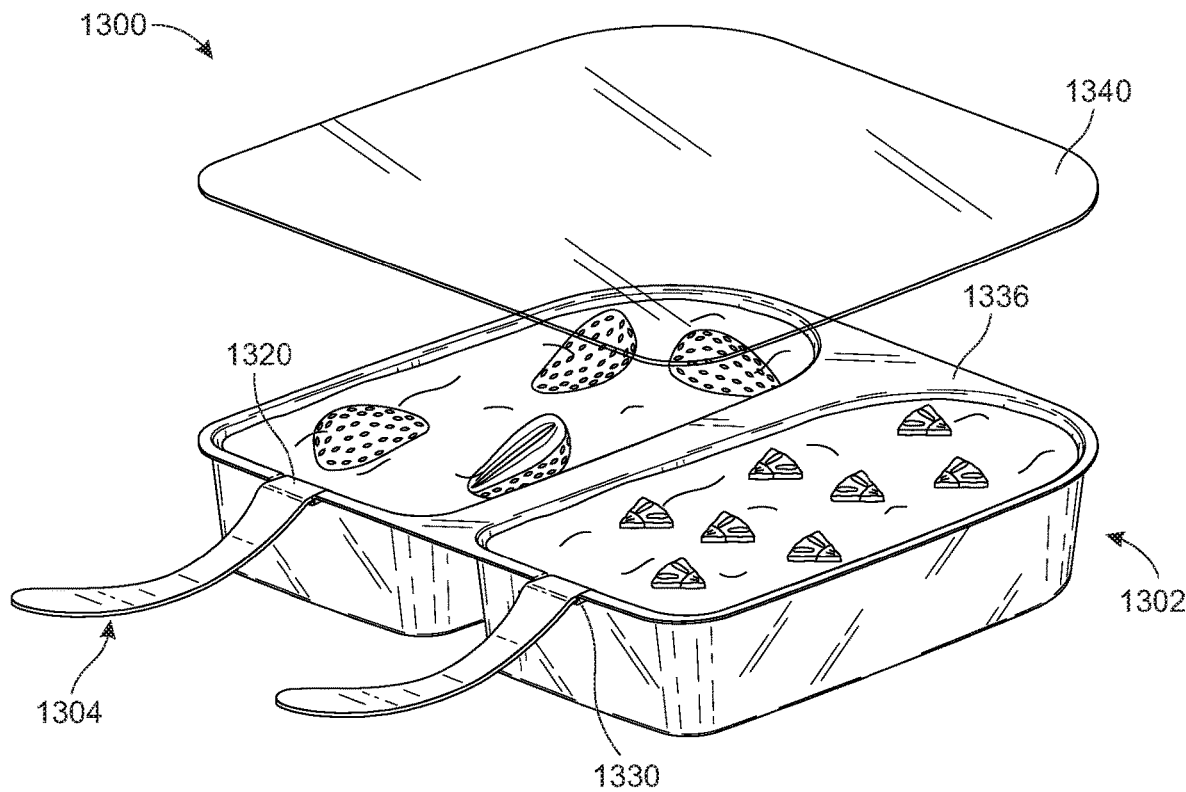
FIG. 13 is an isometric view of the molding system in a second embodiment and in a sealing stage of operation.

Referring now to FIG. 13, therein is shown an isometric view of the molding system 1300 in a second embodiment and in a sealing stage of operation. The molding system 1300 is shown having two molds 1302 and two ice pop sticks 1304.

The ice pop sticks 1304 and the molds 1302 should be understood as identical to the ice pop stick 104 of FIG. 1 and the mold 102 of FIG. 1, respectively. That is, the ice pop sticks 1304 each include a ice pop stick key 1320 which fit and seal with notches 1330 within each of the molds 1302.

As will be appreciated, the molding system 1300 is functionally similar in every way to the molding system 100 of FIG. 1 with the exception that the mold upper lip 1336 couples both molds 1302 together.

A sealing film 1340 can be positioned over the molds 1302. The sealing film 1340 can be heat sealed to the mold upper lip 1336 and to the ice pop stick key 1320 to provide a full liquid and gas seal within the molds 1302 for prolonged and leak free storage.

It is contemplated that the sealing film can be sealed by way of heat sealing or adhesive sealing. The sealing film 3140 can further include a tab located outside of a sealed border around the mold upper lip 1336.

Figure 14:
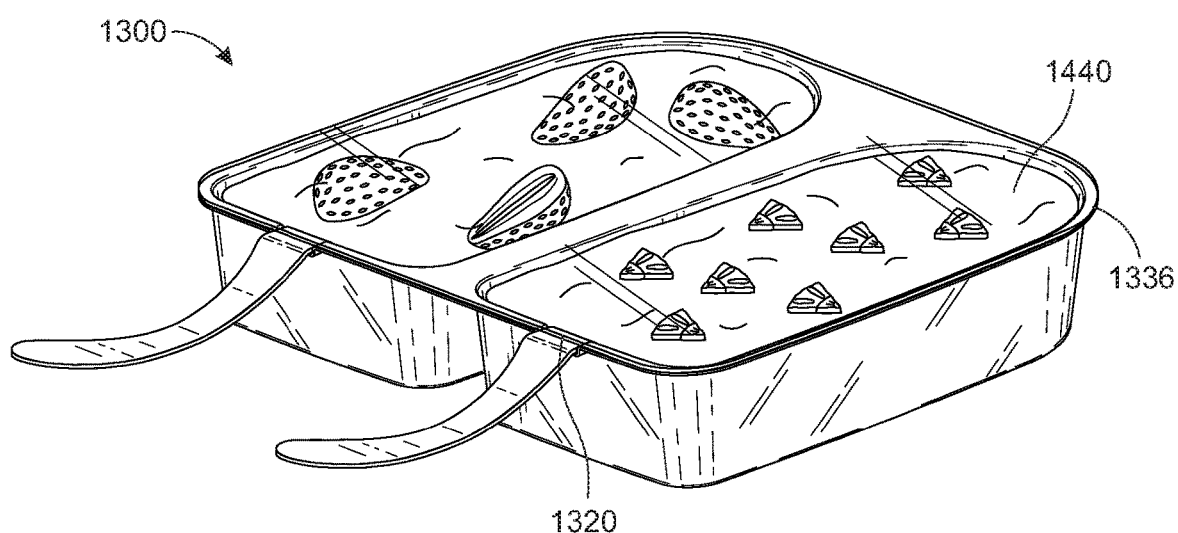
FIG. 14 is an isometric view of the molding system of FIG. 13 after the sealing stage.

Referring now to FIG. 14, therein is shown an isometric view of the molding system 1300 of FIG. 13 after the sealing stage. The molding system 1300 is shown having the sealing film 3140 in direct contact and sealing with the mold upper lip 1336 and the ice pop stick key 1320 for keeping the molded edible snacks in a presentable, fresh, and stable environment.

Figure 15:
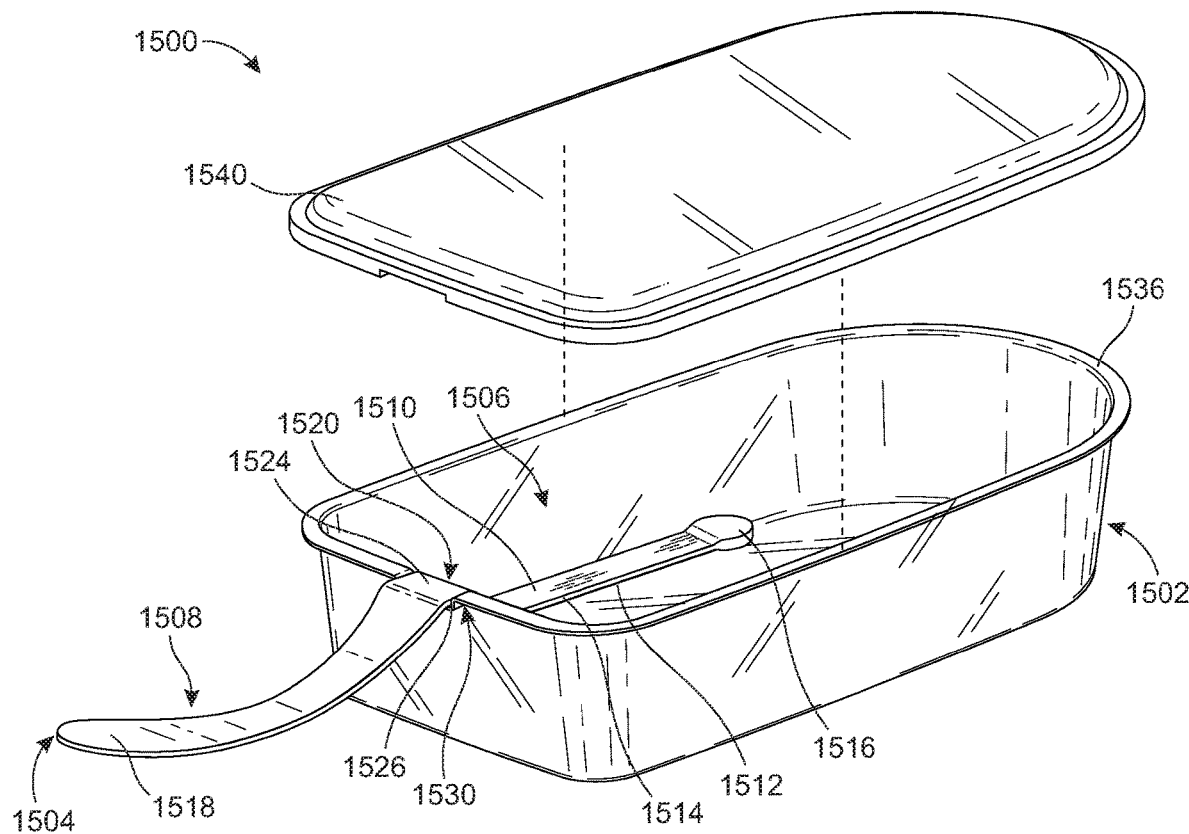
FIG. 15 is an isometric view of the molding system in a third embodiment and in a covering stage of operation.

Referring now to FIG. 15, therein is shown an isometric view of the molding system 1500 in a third embodiment and in a covering stage of operation. The molding system 1500 is depicted including a mold 1502 and a ice pop stick 1504 in a closed configuration, that is, the ice pop stick 1504 is in direct contact with the mold 1502.

The ice pop stick 1504 can have an inner portion 1506 and an external portion 1508. The external portion 1508 is configured to extend out away from the mold 1502 for providing a handle for a user to comfortably grab.

The inner portion 1506 is configured to extend into the mold 1502 and be in direct contact with a molded edible snack within the mold 1502. The inner portion 1506 can include a top side 1510, a bottom side 1512, and an edge 1514.

The top side 1510 and the bottom side 1512 are depicted as substantially parallel with the edge 1514 connecting vertically therebetween. Near one end of the inner portion 1506 of the ice pop stick 1504 furthest from the external portion 1508, the ice pop stick 1504 is depicted having an enlarged end 1516.

The enlarged end 1516 can be enlarged from the inner portion 1506 of the ice pop stick 1504 laterally, vertically, or a combination thereof. The enlarged end 1516 can help to anchor the inner portion 1506 of the ice pop stick 1504 within the molded edible snack providing greater structural and mechanical adhesion therebetween.

The top side 1510, the bottom side 1512, and the edge 1514 of the ice pop stick 1504 can also be textured with a rougher surface texture for greater adhesion between the molded edible snack and the inner portion 1506 of the ice pop stick 1504. The greater adhesion between the molded edible snack and the inner portion 1506 of the ice pop stick 1504 can ensure the molded edible snack remains affixed to the ice pop stick 1504 even under high load or large accelerations.

The external portion 1508 of the ice pop stick 1504 can be formed having a widened handle portion 1518. The widened handle portion 1518 can provide greater comfort for a user.

As will be appreciated, the ice pop stick 1504 is depicted with the inner portion 1506 extended horizontally along a horizontal plane defined by the top side 1510 of the inner portion 1506. The inner portion 1506 and the external portion 1508 can be coupled together by a ice pop stick key 1520.

The ice pop stick key 1520 can be elevated vertically above the inner portion 1506 and the external portion 1508. The external portion 1508 can extend from the ice pop stick key 1520 vertically down and away, in a shallow arc, to the horizontal plane defined by the top side 1510 of the inner portion 1506, and then gently extend back above the horizontal plane defined by the top side 1510 of the inner portion 1506 of the ice pop stick 1504.

It has been discovered that the shallow arc of the external portion 1508 from the ice pop stick key 1520 to the horizontal plane defined by the top side 1510 of the inner portion 1506 provides a structurally balanced molded edible snack in the hand while simultaneously providing an enhanced grip for an end user.

The ice pop stick key 1520 can be vertically above the inner portion 1506 and can be coupled to the inner portion 1506 with a vertical extension. While the vertical extension vertically couples the ice pop stick key 1520 to the inner portion 1506, the vertical extension is not to be understood as extending substantially vertically.

Instead, the vertical extension can follow the contour of the mold 1502 from the ice pop stick key 1520 down to the inner portion 1506. Alternative contemplated embodiments include vertical extensions having a slant so that a portion of the ice pop stick key 1520 overhangs part of the inner portion 1506.

The ice pop stick key 1520 can include a key top side 1524, a key bottom side 1526, and key edges 1528. The key top side 1524 and the key bottom side 1526 can be flat and parallel to one another. The ice pop stick key 1520 can be designed to fit within a notch 1530 formed within the mold 1502.

The notch 1530 within the mold 1502 can include a notch bottom surface coupled to notch side portions extending up to contact a mold upper lip 1536. In the closed configuration as depicted, the ice pop stick key 1520 can fit within and in direct contact with the notch 1530 creating a seal therewith.

That is, the key bottom side 1526 can sit flush against the notch bottom surface. The key edges 1528 can sit flush against the notch side portions. Further, the key top side 1524 can be positioned coplanar with the mold upper lip 1536 so that a seal can be made with the molding system 1500 in a closed configuration with the ice pop stick 1504.

The mold 1502 is shown having a rounded end with a standard ice pop shape. However, it should be understood that other mold shapes are contemplated, and molds of other shapes do not depart from the molding system 1500 as disclosed herein.

The mold 1502 is depicted as a single serve mold for molded edible snacks. It has been discovered that many unexpected benefits arise as a result of implementing the molding system 1500 with molded edible snacks including a reduction in leakage and waste from the ice pop stick 1504 exiting the mold 1502 with the ice pop stick key 1520 through the notch 1530 above a fluid fill level.

It is contemplated that the mold 1502 can be sealed with a lid 1540. The lid 1540 can be attached to the mold upper lip 1536 and to the key top side 1524 for creating a seal.

Figure 16:
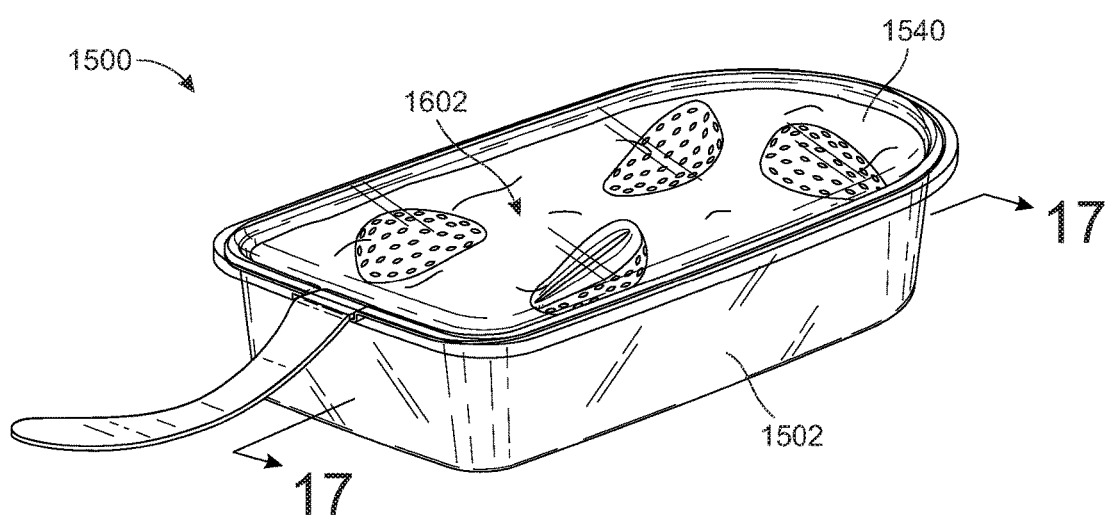
FIG. 16 is an isometric view of the molding system of FIG. 15 after a capping stage of operation.

Referring now to FIG. 16, therein is shown an isometric view of the molding system 1500 of FIG. 15 after a capping stage of operation. The molding system 1500 is shown having a molded edible snack 1602 stored in a frozen state within the mold 1502. The lid 1540 can seal the molded edible snack 1602 within the mold 1502 until an end user is ready to remove the molded edible snack 1602 from the mold 1502.

Figure 17:
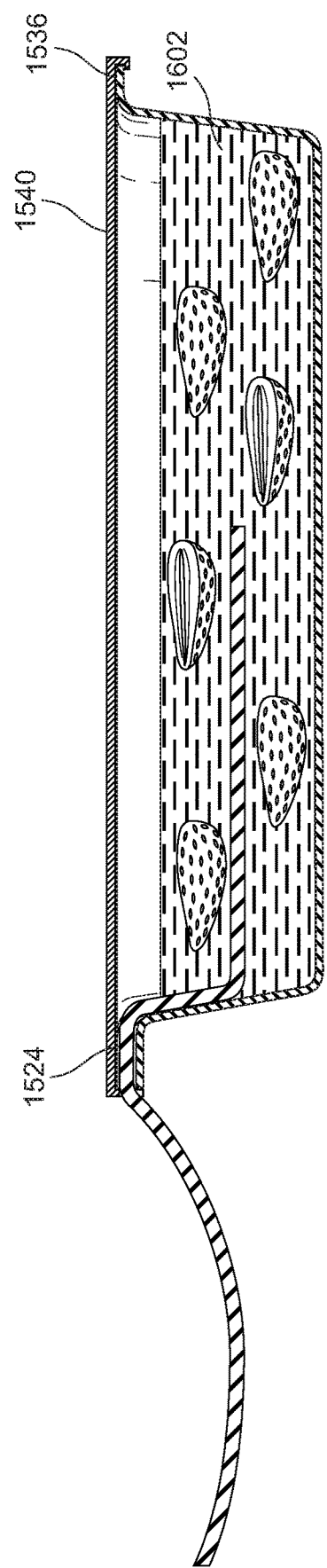
FIG. 17 is a cross-sectional view of the molding system of FIG. 16 along the line 17-17.

Referring now to FIG. 17, therein is shown a cross-sectional view of the molding system 1500 of FIG. 16 along the line 17-17. The lid 1540 is shown affixed to the mold upper lip 1536 as well as the key top side 1524 creating a tight seal.

The molded edible snack 1602 is shown having an even distribution of component parts. Further, the molded edible snack 1602 is shown having a proper snack from being in direct contact with the mold 1502 during formation, transport, storage, and sale.

Thus, it has been discovered that the molding system furnishes important and heretofore unknown and unavailable solutions, capabilities, and functional aspects. The resulting configurations are straightforward, cost-effective, uncomplicated, highly versatile, accurate, sensitive, and effective, and can be implemented by adapting known components for ready, efficient, and economical manufacturing, application, and utilization.

While the molding system has been described in conjunction with a specific best mode, it is to be understood that many alternatives, modifications, and variations will be apparent to those skilled in the art in light of the preceding description. Accordingly, it is intended to embrace all such alternatives, modifications, and variations, which fall within the scope of the included claims. All matters set forth herein or shown in the accompanying drawings are to be interpreted in an illustrative and non-limiting sense.

What is claimed is:

1. A horizontal molding system comprising:
   an ice pop stick, the ice pop stick including:
      an ice pop stick key, the ice pop stick key including a key top side, a key bottom side and key edges,
      an inner portion having a top side, the inner portion vertically below the ice pop stick key, and
      an external portion coupled to the ice pop stick key, the external portion having a curve extended vertically down and horizontally away from the ice pop stick key and extended below a horizontal plane defined by the top side of the inner portion; and
   a mold including a notch and a mold upper lip, the notch configured to directly contact and create a seal with the key edges and the key bottom side based on the ice pop stick being in a closed configuration with the mold, and the key top side being co-planar with the mold upper lip based on the ice pop stick being in the closed configuration with the mold.

2. The system of claim 1 further comprising a sealing film sealed with the mold upper lip and the key top side.

3. The system of claim 1 further comprising a lid sealed with the mold upper lip and the key top side.

4. The system of claim 1 wherein:
   the mold is a first mold; and
   further comprising a second mold connected to the first mold.

5. The system of claim 1 wherein the ice pop stick further includes a vertical extension coupling the ice pop stick key vertically to the inner portion.

6. A horizontal molding system comprising:
   an ice pop stick, the ice pop stick including:
      an ice pop stick key, the ice pop stick key including a key top side, a key bottom side and key edges,
      an inner portion having a top side, the inner portion vertically below the ice pop stick key, and
      an external portion coupled to the ice pop stick key, the external portion having a curve extended vertically down and horizontally away from the ice pop stick key and extended below a horizontal plane defined by the top side of the inner portion; and
   a mold including a fill line, a notch, and a mold upper lip, the notch configured to directly contact and create a seal with the key edges and the key bottom side based on the ice pop stick being in a closed configuration with the mold, the inner portion positioned half way between the fill line and a bottom surface of the mold based on the ice pop stick being in the closed configuration with the mold, and the key top side being co-planar with the mold upper lip based on the ice pop stick being in the closed configuration with the mold.

7. The system of claim 6 wherein the fill line is for filling the mold with a filling without stabilizers.

8. The system of claim 6 wherein the notch is vertically above the fill line.

9. The system of claim 6 wherein the inner portion of the ice pop stick includes an enlarged end for anchoring the inner portion of the ice pop stick within a molded edible snack.

10. The system of claim 6 wherein the inner portion of the ice pop stick includes a rough surface texture for greater adhesion between a molded edible snack and the inner portion of the ice pop stick.

11. A method for manufacturing a horizontal molding system comprising:
   forming an ice pop stick, the ice pop stick including:
      an ice pop stick key, the ice pop stick key including a key top side, a key bottom side and key edges,
      an inner portion having a top side, the inner portion vertically below the ice pop stick key, and
      an external portion coupled to the ice pop stick key, the external portion having a curve extended vertically down and horizontally away from the ice pop stick key and extended below a horizontal plane defined by the top side of the inner portion; and forming a mold including a notch and a mold upper lip, the notch configured to directly contact and create a seal with the key edges and the key bottom side based on the ice pop stick being in a closed configuration with the mold, and the key top side being co-planar with the mold upper lip based on the ice pop stick being in the closed configuration with the mold.

12. The method of claim 11 further comprising sealing the mold upper lip and the key top side with a sealing film.

13. The method of claim 11 further comprising sealing the mold upper lip and the key top side with a lid.

14. The method of claim 11 wherein:
forming the mold includes forming a first mold; and
further comprising forming a second mold connected to the first mold.

15. The method of claim 11 wherein forming the ice pop stick further includes forming a vertical extension coupling the ice pop stick key vertically to the inner portion.

16. The method of claim 11 wherein forming the mold further includes forming the mold having a fill line, and wherein the inner portion of the ice pop stick is positioned half way between the fill line and a bottom surface of the mold based on the ice pop stick being in the closed configuration with the mold.

17. The method of claim 16 wherein forming the mold having the fill line includes forming the mold having the fill line for filling the mold with a filling without stabilizers.

18. The method of claim 16 wherein forming the mold having the notch and the fill line further includes forming the notch vertically above the fill line.

19. The system of claim 16 wherein forming the inner portion of the ice pop stick includes forming an enlarged end for anchoring the inner portion of the ice pop stick within a molded edible snack.

20. The method of claim 16 wherein forming the inner portion of the ice pop stick includes forming a rough surface texture on the inner portion for greater adhesion between a molded edible snack and the inner portion of the ice pop stick.

* * * * *